C. L. CADLE.
PROCESS OF BONDING RAILS.
APPLICATION FILED JAN. 2, 1907. RENEWED OCT. 21, 1908.

950,716.

Patented Mar. 1, 1910.

Witnesses
E. L. Puck
Jno. F. Oberlin

Inventor,
Charles L. Cadle
by J. B. Fay
his attorney.

UNITED STATES PATENT OFFICE.

CHARLES L. CADLE, OF CLEVELAND, OHIO, ASSIGNOR TO THE ELECTRIC RAILWAY IMPROVEMENT COMPANY, OF CLEVELAND, OHIO, A CORPORATION OF OHIO.

PROCESS OF BONDING RAILS.

950,716. Specification of Letters Patent. Patented Mar. 1, 1910.

Application filed January 2, 1907, Serial No. 350,331. Renewed October 21, 1908. Serial No. 458,884.

*To all whom it may concern:*

Be it known that I, CHARLES L. CADLE, a citizen of the United States, resident of Cleveland, county of Cuyahoga, and State of Ohio, have invented a new and useful Improvement in Processes of Bonding Rails, of which the following is a specification, the principle of the invention being herein explained and the best mode in which I have contemplated applying that principle, so as to distinguish it from other inventions.

My invention relates to methods of making homogeneous mechanical junctures between two metallic bodies, and has particular regard to an improved process of bonding rails or similar conductors, by the use of an electric current, whereby sufficient heat is developed at the proper points to solder, braze, or weld a bonding member across the gap intervening between the meeting ends of the rails.

It is to the laminated type of bond that my improved process is particularly applicable, but, as will hereinafter appear, it may be more or less generally applied in connection with other types of bonds and with bonding operations other than rail-bonding.

The object of the invention is to effect such bonding process in a more economical and at the same time superior fashion, as compared with processes at present in use.

Said invention consists of the steps hereinafter fully described and specifically set forth in the claims.

The annexed drawings and the following description set forth in detail one mode of carrying out the invention, such disclosed mode, however, constituting but one of various ways in which the principle of the invention may be used.

Figure 1:
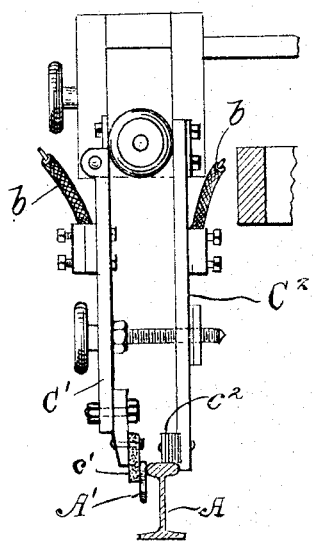
Figure 2:
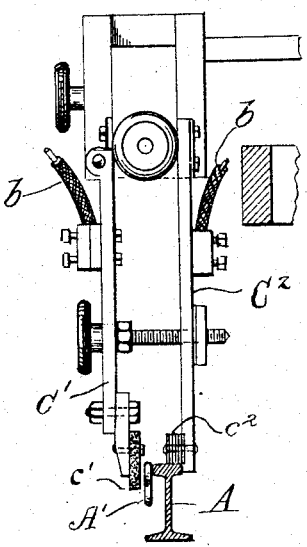
Figure 3:
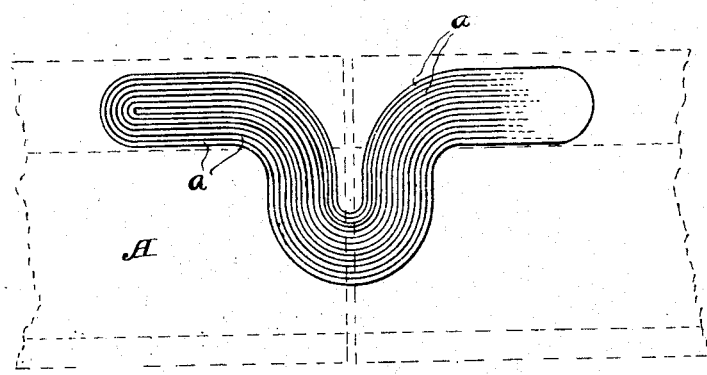

In said annexed drawings: Figure 1 is an end elevation of a specific form of bonding device such as I prefer to employ in carrying out my process; Fig. 2 is a similar view of such device with the parts shown in the position assumed at another stage of the process; and Fig. 3 is a view of a bond and a section of rail, such bond being shown at one end, the left, as it appears at the conclusion of one step in the carrying out of my improved process, while the other end is shown as it is left at the conclusion of such process.

As has been remarked, the type of bond for the application of which to the rails my process is particularly designed, is the so-called laminated type, *i. e.* that in which the bond is made up of a plurality of superimposed conductors, which may be terminally riveted or otherwise bound together, but which are preferably formed out of a continuous strand wound around and around upon itself. The bond thus formed usually comprises an intermediate arched body-portion and lateral oppositely extending heads, which latter are the portions designed to be directly attached to the rails. In the preferred form of such bond the strand employed is relatively narrow and the bond is preferably applied against the sides of the rail, since it occupies an inappreciable space, and this portion of the rail, especially when *in situ*, is much more readily accessible than either the web or the flange of the rail.

To effect the attachment of the bond as the operation is ordinarily practiced, the face of the head that is intended to be thus directly applied to the rail is provided with a suitable layer of solder and flux, or else such latter materials are introduced between the same at the time of application. The bond being then clamped or otherwise held against the rail, an electric current is passed therethrough, which, by virtue of an interposed high resistance, develops heat sufficient to fuse the solder or braze and thus fix the bond in place. The objection to this method of attaching bonds, when applied to the ordinary laminated bond, is that unless all the strands are thus laterally soldered, a result that it is obviously very difficult to attain, the full capacity of the bond as a conductor will not be realized. To overcome this difficulty it has latterly been proposed to forge or weld the bond head, whereby the strands entering therein are made homogeneous and integral, and thus, whether the entire face be soldered to the rail or not, the carrying capacity of all the separate strands is nevertheless available. The additional step thus introduced into the manufacture of the bonds, however, has added materially to their cost, and the expense of applying them, of course, is just the same as before.

By my invention, as will be presently set forth, I am able to take the loosely-wound bond and not merely solder the edges of the strips or laminations to the rail, but simultaneously form a solid head of the laminations entering therein which head is fully equivalent to the solid head produced by drop-forging the bond in the factory.

In carrying out my improved process, having reference particularly to the illustrative apparatus shown in the several figures of the drawings, I clamp first one head then the other of the loose bond A' tightly against the side of the ball or web as the case may be of the rail A, Fig. 1. The latter is of course first abraded by an emery wheel or the like so as to present a bright metallic surface, and between such surface and the bond the usual solder, or braze, and flux are interposed. The particular device here shown, it should be stated, forms a part of the subject-mater disclosed in my pending application for U. S. Letters Patent filed January 2, 1907, Serial No. 350,330, and includes as elements of present interest two pendent arms C' C², adapted, respectively, to rest against the inner and outer sides of the rail. The former of such arms is provided at its lower extremity with a block $c'$ of carbon or other high resistance material, that is designed to bear directly against the bond head; the other arm, C², is provided a short distance from its extremity with an inwardly projecting block $c^2$ of copper forming a foot that is designed to rest upon the upper brightly worn ball of the rail.

The current utilized in effecting the operation that will now be described is ordinarily most conveniently drawn from the regular trolley circuit, and in order to be of use requires to be considerably stepped up in amperage with a consequent reduction in voltage. This current, by means of suitable conductors $b$ is then transmitted through interposed resistance $c'$, the bond A', and the rail A, whereby sufficient heat is presently developed to fuse the aforesaid solder and to attach the lateral edges of the component strands $a$ of the bond to the rail. The bond terminal when attached in this manner appears as shown at the left in Fig. 3. Obviously if the soldering or fluxing material chances to become unevenly spread over the contacting face of the bond head only a part of the strands entering such head are of service as conductors and the efficiency of the bond measurably diminished. In carrying out my process, however, as soon as the solder or braze thus begins to melt, I promptly withdraw outer clamp-arm C' a trifle, so as to leave an air-gap of from 1/32 to 1/64 of an inch between the major portion of the face of the resistance block and the bond-head, Fig. 2. Immediately a broad arc is developed through such gap and a consequently intense heat results whereby the strands entering into the bond-head are very quickly fused together. Obviously, by reason of the heat conductivity of the copper constituting the material of the bond such arc is simultaneously effective to raise the conducting face of the rail to a corresponding high temperature, so that not only is interfusion of the bond's strands secured, but also a more permanent and homogeneous juncture between such strands and the rail. It will of course be understood that the bond requires to be externally supported during the final heating step. This may be accomplished in various ways; a brick, or the earth, or, where operating in city streets, the pavement foundation, may be indifferently utilized for this purpose. Moreover, in practice, since, as above indicated, the resistance block need not be entirely out of contact with the face of the bond, such resistance block may be ordinarily relied upon to retain the bond in place. It should be understood, in other words, that the face of the resistance block or electrode need not be entirely out of contact with the bond terminal, but only, as above stated, sufficiently relieved from pressure so as to leave an air gap between the major portion of the juxtaposed faces of the block and terminal. The clamp is now withdrawn, and the bond terminals, cooling as they do very rapidly, at once "set" and the operation is complete. The bond head now presents substantially the appearance shown at the right in Fig. 3. In other words the strands entering such head become thoroughly fused together and the resultant structure as much an integral homogeneous mass as though it had been drop-forged in the process of manufacture. Every strand is thus in effect given direct contact with the side of the rail and an effective electrical union of the rail ends assured. My process has the further advantage of being more economical in the consumption of current than the old method since it is much more quickly carried out than where the interposed resistance alone is utilized to raise the bond to a sufficiently high temperature for properly soldering it to the rail. At the same time bonding by such process can be carried on satisfactorily with a lower available current amperage than by other methods, and not infrequently in the field a low amperage has to be contended with owing to the fluctuations of the current of the trolley circuit occasioned by the variable demand for power of the motors operated thereby.

Other modes of applying the principle of my invention may be employed instead of the one explained, change being made as regards the process herein disclosed, provided the step or steps stated by any one of the following claims or the equivalents of such stated step or steps be employed.

I therefore particularly point out and distinctly claim as my invention:—

1. The method of joining metallic bodies, which consists in first soldering or brazing said bodies together, and then raising the same to substantially a welding temperature by means of a voltaic arc.

2. The method of joining metallic bodies, which consists in first soldering or brazing said bodies together by electrically generated heat, and then raising the same to substantially a welding temperature by means of a voltaic arc.

3. The method of joining metallic bodies by means of the electric current, which consists in first soldering or brazing said bodies together by means of a heating electric current and then welding the same together by means of a voltaic arc.

4. The method of joining metallic bodies by means of the electric current, which consists in interposing a solder or braze between the adjacent faces of said bodies, bringing a body having a high resistance into contact with one of said bodies, passing an electric current in series through said bodies and interposed solder or braze, and then withdrawing said high resistance body so as to form an arc between it and the adjacent metallic body.

5. The method of homogeneously uniting metal bodies having unlike characteristics as to fusibility, the first, or more readily fusible, body having also the greater heat conductivity, which consists in interposing between said bodies at the desired point of union a relatively more fusible material; holding said bodies in contact at such point; fusing such material, whereby said bodies are preliminarily joined; then applying heat from a voltaic arc to said first body; and securing effective heating of the contacting face of the second body by conduction through such first body, whereby said first body and such contacting face of the second body are brought to a welding temperature practically simultaneously, substantially as described.

6. The method of homogeneously uniting metal bodies having unlike masses and different temperatures of fusion, the first, or smaller, body having both the lower temperature of fusion and the greater heat conductivity, which consists in interposing between said bodies at the desired point of union a material having a temperature of fusion slightly lower than that of said first body; holding said bodies in contact at such point; fusing such material, whereby said bodies are preliminarily joined; holding an electrode of high resistance adjacent to said smaller body and passing an electric current through said electrode, bodies, and material, said electrode being slightly spaced from said smaller body so that an arc is formed therebetween; and securing effective heating of the face of the second body in contact with the first body by conduction through such first body, whereby said first body and such contacting face of the second body are brought to a welding temperature practically simultaneously, substantially as described.

7. The method of homogeneously uniting metal bodies having unlike characteristics as to fusibility, which consists in interposing between said bodies at the desired point of union a relatively more fusible material; holding said bodies in contact at such point; pressing an electrode of high resistance against the outer face of the first, or more readily fusible, body; passing an electric current through said electrode, bodies, and interposed material, such current being adapted to develop sufficient heat to effect the fusion of said material; then slightly withdrawing said electrode, whereby an arc is formed between the same and said smaller body; and securing effective heating of the contacting face of the second body by conduction from such arc through said first body and the joint thus made to such contacting face, whereby said first body and such contacting face of the second body are brought to a welding temperature practically simultaneously, substantially as described.

8. The method of homogeneously uniting metal bodies of unlike masses and different temperatures of fusion, the smaller mass having also the lower temperature of fusion, which consists in interposing between said bodies at the desired point of union a material having a temperature of fusion slightly lower than that of said smaller body; holding said bodies in contact at such point, pressing an electrode of high resistance against the outer face of said smaller body; passing an electric current through said electrode, bodies, and interposed material, such current being adapted to develop sufficient heat to effect the fusion of said material; then slightly withdrawing said electrode, whereby an arc is formed between the same and said smaller body; and securing effective heating of the contacting face of said larger body by conduction from such arc through said smaller body and the joint thus made to such contacting face of said larger body, whereby said smaller body and such contacting face of the larger body are brought to a welding temperature practically simultaneously, substantially as described.

9. The method of homogeneously uniting metal bodies of unlike masses and different temperatures of fusion, the smaller mass having both the lower temperature of fusion and the greater heat conductivity, which consists in interposing between said bodies at the desired point of union a material having a temperature of fusion slightly lower than that of said smaller body; holding said bodies in contact at such joint; pressing an electrode of high resistance against the outer face of said smaller body; then passing a heating electric current through said electrode, bodies, and interposed material, such current being adapted to effect the fusion of said material; then slightly withdrawing said electrode, whereby an arc is formed between the same and said smaller body; and securing effective heating of the contacting face of the larger body by conduction from such arc through said smaller body and fused material to such contacting face, whereby said smaller body and such contacting face of the larger body are brought to a welding temperature practically simultaneously, substantially as described.

10. The method of homogeneously uniting a bond to a steel rail, which consists in interposing between said bond and rail at the desired point of union, a braze having a temperature of fusion slightly lower than that of said bond; holding said bond against the rail at such point; pressing an electrode having a high resistance against the outer face of said bond; passing a heating electric current through said electrode, bond, braze and rail, such current being adapted to develop sufficient heat to effect the fusion of said braze; then slightly withdrawing said electrode, whereby an arc is formed between the same and said bond; and securing the effective heating of the contacting face of the rail by conduction from such arc through said bond and fused braze to such face, whereby said bond and such contacting face of the rail are brought to a welding temperature practically simultaneously, substantially as described.

11. The method of joining a bond to a rail by means of the electric current, which consists in first holding the head of such bond against the rail, a solder or braze being interposed between said bond and rail, pressing an electrode having a high resistance against the outer face of said bond; passing a current through such circuit including such bond and rail and the interposed solder or braze, and electrode; and then withdrawing the latter from said bond so as to form an arc therebetween.

12. The method of joining a bond of laminate type to a rail, which consists in passing an electric current through the head of such bond and the rail, a material having a lower fusing point than said bond being interposed between said bond and rail, and a body having a high resistance being pressed against the outer face of said bond head, whereby said material is fused and said bond head is preliminarily joined to said rail by such current; and then forming a voltaic arc between said bond head and resistance body, whereby the separate laminæ entering into the head are fused together.

13. The method of joining a bond of laminate type to a rail, which consists in first holding the head of such bond against the rail, a material having a lower fusing point than said bond being interposed between the same and said rail, and a body having a high resistance being pressed against the outer face of said bond; passing a current through a circuit including said rail, bond, material, and high resistance body, whereby said material is fused and said bond head preliminarily joined to said rail; and then slightly withdrawing said high resistance body from said bond until an arc is formed therebetween, whereby the separate laminæ entering into the head of said bond are fused together.

14. The method of joining a bond of laminate type to a rail, which consists in passing an electric current through the head of such bond and the rail, a material having a lower fusing point than said bond being interposed between the same and said rail and a body having a high resistance being pressed against the outer face of said bond, whereby said material is fused and said bond head preliminarily joined to said rail by such current; and then forming a voltaic arc between said bond head and high resistance body, whereby the separate laminæ entering into the head are fused together and a homogeneous juncture of the latter with the rail effected.

15. The method of joining a bond of laminate type to a rail, which consists in first holding the head of such bond against the rail, a material having a lower fusing point than said bond being interposed between the same and said rail, and a body having high resistance being pressed against the outer face of said bond; passing a current through a circuit including said rail, bond head, material, and high resistance body, whereby said material is fused and said bond preliminarily joined to said rail; and then slightly withdrawing said resistance body from said bond until an arc is formed therebetween, whereby the separate laminæ entering into the head of said bond are fused together and a homogeneous juncture of the latter with the rail effected.

16. The method of joining metallic bodies by means of the electric current, which consists in first passing a heating electric current through the bodies to be joined, a body having a high resistance being held against one of said metallic bodies; and then forming a voltaic arc between said high resistance body and adjacent metallic body.

17. The method of homogeneously uniting metal bodies having unlike characteristics as to fusibility, the more readily fusible body having also the greater heat conductivity;

which consists in holding said bodies in contact at the desired point of union; and directly heating the first or more readily fusible body only, such heating being effected by pressing an electrode of high resistance against the outer face of said first body and passing a heating electric current through said electrode and bodies; then slightly withdrawing said electrode, whereby an arc is formed between the same and such first body; and securing effective heating of the contacting face of the second body by conduction through said first body, whereby said first body and such contacting face of the second body are brought to a welding temperature practically simultaneously, substantially as described.

18. The method of homogeneously uniting metal bodies of unlike masses and different temperatures of fusion, the smaller body having both the lower temperature of fusion and the greater heat conductivity; which consists in holding said bodies in contact at the desired point of union; and directly heating said smaller body only, such heating being effected by pressing an electrode of high resistance against the outer face of said smaller body and passing a heating electric current through said electrode and bodies; then slightly withdrawing said electrode, whereby an arc is formed between the same and said smaller body; and securing effective heating of the contacting face of said larger body by conduction through said smaller body, whereby said smaller body and the contacting face of said larger body are brought to a welding temperature practically, simultaneously, substantially as described.

19. The method of homogeneously uniting metal bodies having unlike characteristics as to fusibility, the more readily fusible body having also the greater heat conductivity; which consists in holding said bodies in contact at the desired point of union; and directly heating the first, or more readily fusible, body only, such heating being effected by pressing an electrode of high resistance against the outer face of said first body and thereupon passing an electric current through said electrode and bodies; then slightly withdrawing said electrode, whereby an arc is formed between the same and said smaller body; and securing effective heating of the contacting face of the second body by conduction from such arc through said first body, whereby said first body and such contacting face of the second body are brought to a welding temperature practically simultaneously, substantially as described.

20. The method of homogeneously uniting metal bodies of unlike masses and different temperatures of fusion, the smaller mass having both the lower temperature of fusion and the greater heat conductivity; which consists in holding said bodies in contact at the desired point of union; and directly heating said smaller body only, such heating being effected by pressing an electrode of high resistance against the outer face of said smaller body and then passing an electric current through said electrode and bodies; then slightly withdrawing said electrode, whereby an arc is formed between the same and said smaller body; and securing effective heating of the contacting face of the second body by conduction from such arc through said first body, whereby said first body and such contacting face of the second body are brought to a welding temperature practically simultaneously, substantially as described.

21. The method of joining a bond to a rail by means of the electric current, which consists in first holding such bond against the rail; pressing a body having a high resistance against said bond; passing a current through a circuit including such interposed resistance, bond and rail; and then withdrawing said resistance body from said bond so as to form an arc therebetween.

22. The method of homogeneously uniting a bond to a steel rail, which consists in holding the bond in contact with the rail at the desired point of union; and directly heating the bond only, such heating being effected by pressing an electrode of high resistance against the outer face of said bond and then passing an electric current through said electrode, bond and rail; then slightly withdrawing said electrode, whereby an arc is formed between the same and said bond; and securing effective heating of the contacting face of said rail from such arc by conduction through said bond, whereby said bond and said contacting face of the rail are brought to a welding temperature practically simultaneously, substantially as described.

Signed by me, this 27th day of December, 1906.

CHARLES L. CADLE.

Attested by—
D. T. DAVIES,
JNO. F. OBERLIN.